United States Patent [19]

Kuribayashi

[11] Patent Number: 4,716,400
[45] Date of Patent: Dec. 29, 1987

[54] KEY SENSING SYSTEM
[75] Inventor: Yukio Kuribayashi, Soka, Japan
[73] Assignee: Aica Kogyo Co., Ltd., Nagoya, Japan
[21] Appl. No.: 827,063
[22] Filed: Feb. 7, 1986
[30] Foreign Application Priority Data
 Jun. 7, 1985 [JP] Japan .................. 60-86176
[51] Int. Cl.⁴ .............................. G08B 13/14
[52] U.S. Cl. .................. 340/572; 70/456 R
[58] Field of Search ........... 335/205; 70/456 R, 458, 70/276, 408; 206/37.1, 818; 340/568, 572

[56] References Cited
U.S. PATENT DOCUMENTS 2,589,349  3/1952  Diefenbach ............... 70/456 R
3,007,568  11/1961  Kurland ................ 206/37.1 X
4,150,350  8/1979  Fong ...................... 335/205
4,213,110  7/1980  Holce .................. 335/205 X

FOREIGN PATENT DOCUMENTS 925841  5/1963  United Kingdom ........... 70/456 R

Primary Examiner—A. T. Grimley
Assistant Examiner—Jane K. Lau
Attorney, Agent, or Firm—Finnegan, Henderson, Farabow, Garrett & Dunner

[57] ABSTRACT

The present keysensor (1) includes a base (2) for placing a keyholder (4) with a magnet (7) contained and a magnetic sensor (3) installed on a reverse side thereof, thus, it is possible to facilitate the use and to employ a fixed-type keyholder.

4 Claims, 4 Drawing Figures

KEY SENSING SYSTEM

BACKGROUND OF THE INVENTION

1. Technological Field

The present invention relates to a keysensor for sensing the existence of a keyholder.

2. Prior Art

Conventionally, keysensors are used for sensing whether a keyholder is inserted to know the room is occupied or vacant at a hotel, etc. Such keysensors are constituted so as to oppose a magnet to a magnetic switch via an insertion hole for the keyholder. Additionally, an iron sheet is built in the keyholder. When the keyholder is inserted into the keysensor, the magnetic switch goes off, for the magnetic path is interrupted by the iron sheet. When the keyholder is removed, the magnetic switch goes on. These keysensors are constituted so as to insert or remove only the plate-shaped holder portion of a separate type keyholder connecting a key to a holder by chain, etc. in or from the insertion hole.

The conventional keyholders mentioned above have defects such as being troublesome for the keyholder to be inserted in the hole each time or impossible to use for a fixed-type keyholder, as they are only for a separate type keyholder.

The present invention is provided with a base for placing a keyholder where a magnet, not a conventional iron sheet, is contained. On the reverse side of the base, a magnetic sensor is installed. It is possible to sense whether the keyholder is on the base or not by placing the keyholder on the base and monitoring the magnetic sensor installed on the reverse side of the base.

DETAILED DESCRIPTION OF THE PREFERRED EMBODIMENT

The preferred embodiment of the present invention will be described as follows in accordance with the drawings.

Figure 1:
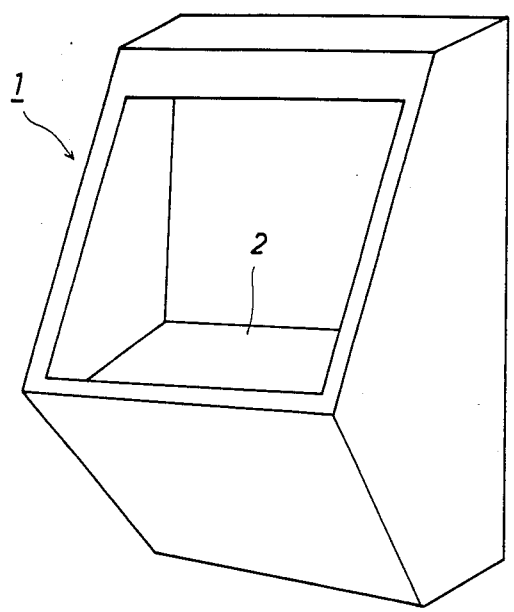
FIG. 1 is a sketch drawing of a keysensor embodying the teachings of the present invention.

In FIG. 1, a sketch drawing of an embodiment of the present invention is shown. Numeral 1 shows a keysensor as a whole, 2 shows a base for placing a keyholder. The keysensor 1 is preferably installed so as to facilitate the insertion and removal of the keyholder.

Figure 2:
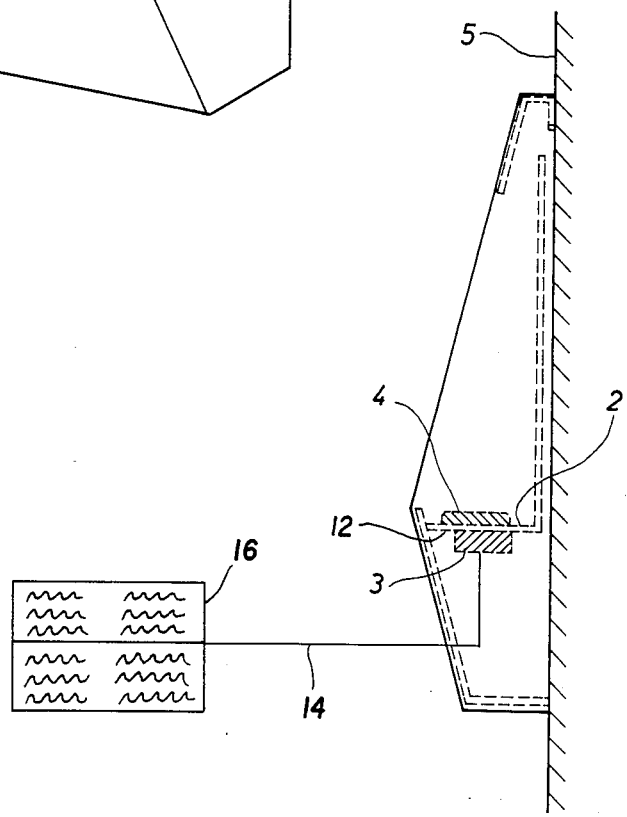
FIG. 2 is a side view showing an internal constitution of the the keysensor of FIG. 1.

In FIG. 2, a side view of an internal constitution of the embodiment mentioned above is shown. Numeral (3) is a magnetic sensor installed on the reverse side of the base (2). Numeral (4) is the placed keyholder, (5) shows the wall. The magnetic sensor (3) senses the condition of the keyholder (4) being placed on the base (2) as the magnet is contained by the keyholder (4) as described hereinafter. So it is preferably for the base (2) to be made of non-magnetic material such as plastic indicated by numeral 12 in FIG. 2. Also, it is acceptable for the magnetic sensor (3) to be constituted so as to turn off the switch in case of sensing the magnet 7 and to send an output signal to a central indicating station 16 at a front of a hotel, etc. via lead wire 14.

Figure 3:
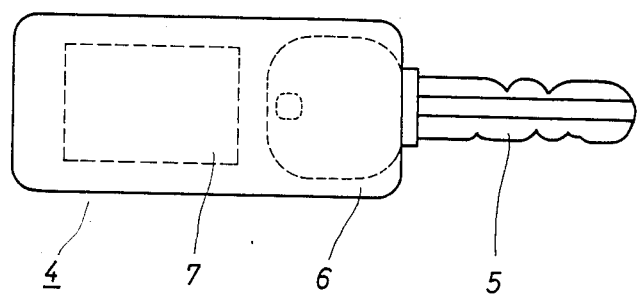
FIG. 3A is a plan view of a fixed-type keyholder.
FIG. 3B is a side view of the fixed-type keyholder.
Figure 3:
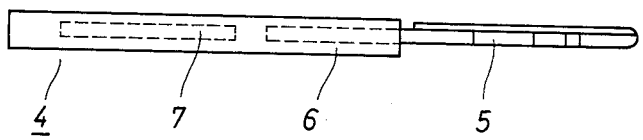

An example of a fixed-type keyholder is shown in FIG. 3. FIG. 3(A) shows a plan view thereof and FIG. 3(B) a side view thereof. In these two figures, numeral (10) shows a key, (6) a holder and (7) a magnet. An end of the key 10 is inserted and fixed into the holder (6). The magnet (7) is contained by the holder (6) of non-magnetic material. In the figures, the holder (6) is plate-shaped but other shapes, e.g., square rod, are acceptable for the keysensor of the present invention. In addition, even the separate type keyholder can be used for the present invention if the magnet is built in there.

It is possible to select the size and the shape of the base (2) provided to the present invention in accordance with those of the keyholder (4). And the magnetic sensor (3) can securely operate with a plurality of sensors placed at a suitable intervals, however differently the keyholder (4) is placed, i.e. so as to accomodate a plurality of orientations of the keyholder on the base to activate the magnetic sensor.

As described above, the present invention can be used for any type of keyholders having a magnet contained therein, regardless of whether the keyholder is a separate type or a fixed-type. It is possible to use the present invention merely by placing the keyholder there, free from the trouble to insert the keyholder in the insertion hole every time like the conventional keysensors.

What is claimed is:

1. A key sensing system, said system including a keyholder having a non-magnetic portion with a magnet disposed therein and a key fixedly attached thereto, comprising:

a keysensor housing having a front surface and a rear surface, said front surface having a cavity therein and said cavity having a plate-like portion positioned substantially perpendicularly with respect to said rear surface, said plate-like portion being configured to receive said non-magnetic portion of said keyholder in a plurality of orientations relative to said rear surface; and at least one magnetic sensor positioned in said keysensor housing immediately below said plate-like portion for sensing said magnet disposed in said non-magnetic portion of said keyholder when said non-magnetic portion is positioned on said base in one of said plurality of orientations.

2. The key sensing system of claim 1 wherein said base is of non-magnetic material.

3. The key sensing system of claim 1 wherein said rear surface of said keysensor housing is attached to a wall.

4. The key sensing system of claim 1, wherein said magnetic sensor generates an output signal in accordance with sensing said magnet of said keyholder, said signal being transmitted to a remote indicating station to indicate the status of said key sensing system.

* * * * *